US012652114B2

(12) United States Patent
Fakoorian et al.

(10) Patent No.: US 12,652,114 B2
(45) Date of Patent: Jun. 9, 2026

(54) CROSS LINK INTERFERENCE (CLI) CONFIGURATION AND MEASUREMENT

(71) Applicant: Apple Inc., Cupertino, CA (US)

(72) Inventors: Seyed Ali Akbar Fakoorian, San Diego, CA (US); Wei Zeng, Saratoga, CA (US); Dawei Zhang, Saratoga, CA (US); Hong He, San Jose, CA (US); Haitong Sun, Cupertino, CA (US); Chunxuan Ye, San Diego, CA (US); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 18/244,538

(22) Filed: Sep. 11, 2023

(65) Prior Publication Data

US 2024/0146425 A1 May 2, 2024

Related U.S. Application Data

(60) Provisional application No. 63/421,812, filed on Nov. 2, 2022.

(51) Int. Cl.
H04W 4/00 (2018.01)
H04B 17/336 (2015.01)
(Continued)

(52) U.S. Cl.
CPC ........ H04B 17/336 (2015.01); H04W 72/232 (2023.01); H04W 76/20 (2018.02);
(Continued)

(58) Field of Classification Search
None
See application file for complete search history.

(56) References Cited

U.S. PATENT DOCUMENTS

| | | |
|---|---|---|
| 2018/0279334 A1 | 9/2018 | Lim et al. |
| 2021/0250797 A1 | 8/2021 | Karjalainen et al. |

(Continued)

FOREIGN PATENT DOCUMENTS

| | | |
|---|---|---|
| WO | WO 2020143027 A1 | 7/2020 |
| WO | WO 2020144624 A1 | 7/2020 |

(Continued)

OTHER PUBLICATIONS

International Search Report and Written Opinion directed to International Application No. PCT/US2023/078354, mailed Feb. 28, 2024; 9 pages.

(Continued)

*Primary Examiner* — Bob A Phunkulh

(74) *Attorney, Agent, or Firm* — Sterne, Kessler, Goldstein & Fox P.L.L.C.

(57) ABSTRACT

Some aspects of this disclosure relate to apparatuses and methods for implementing cross link interference (CLI) measurement indication. For example, a user equipment (UE) includes a transceiver configured to enable wireless communication with a base station and a processor communicatively coupled to the transceiver. The processor can be configured to receive, using the transceiver, a configuration message from the base station indicating a plurality of cross link interference (CLI) resources. The processor is further configured to receive, using the transceiver, an activation message from the base station activating one or more of the plurality of CLI resources. The processor is further configured to perform a CLI measurement during at least one CLI resource of the activated one or more of the plurality of CLI resources.

20 Claims, 8 Drawing Sheets

(51) Int. Cl.

| | |
|---|---|
| *H04W 72/232* | (2023.01) |
| *H04W 76/20* | (2018.01) |
| *H04L 5/00* | (2006.01) |
| *H04L 5/14* | (2006.01) |

(52) U.S. Cl.
CPC ............ *H04L 5/001* (2013.01); *H04L 5/0094* (2013.01); *H04L 5/14* (2013.01)

(56) References Cited

U.S. PATENT DOCUMENTS

| | | | | |
|---|---|---|---|---|
| 2021/0289374 | A1 | 9/2021 | Zhang et al. | |
| 2022/0014954 | A1* | 1/2022 | Ibrahim | H04W 72/21 |
| 2022/0077999 | A1 | 3/2022 | Babaei et al. | |
| 2022/0086843 | A1* | 3/2022 | Ying | H04W 72/541 |
| 2022/0116129 | A1 | 4/2022 | Ying et al. | |
| 2023/0055304 | A1* | 2/2023 | Shim | H04W 72/541 |
| 2023/0113873 | A1* | 4/2023 | Ibrahim | H04B 17/336 370/329 |
| 2023/0164609 | A1* | 5/2023 | Orsino | H04W 76/30 709/224 |
| 2023/0171072 | A1* | 6/2023 | Ibrahim | H04L 5/0048 370/329 |
| 2023/0269611 | A1* | 8/2023 | Ren | H04W 24/10 370/252 |
| 2023/0327787 | A1* | 10/2023 | Bai | H04W 24/08 370/252 |
| 2023/0328560 | A1* | 10/2023 | Ibrahim | H04W 24/08 370/252 |
| 2023/0328564 | A1* | 10/2023 | Bai | H04W 24/10 370/252 |
| 2023/0362897 | A1* | 11/2023 | Xu | H04W 24/08 |
| 2024/0007927 | A1* | 1/2024 | Xu | H04W 8/005 |
| 2024/0049022 | A1* | 2/2024 | Ibrahim | H04B 1/54 |
| 2024/0147278 | A1* | 5/2024 | Santhappan | H04W 24/08 |
| 2024/0275508 | A1* | 8/2024 | Chi | H04B 17/345 |
| 2025/0016819 | A1* | 1/2025 | Ren | H04W 72/566 |
| 2025/0150181 | A1* | 5/2025 | Xu | H04W 24/10 |
| 2025/0159530 | A1* | 5/2025 | Ren | H04W 24/10 |
| 2025/0234230 | A1* | 7/2025 | Ren | H04W 24/10 |

FOREIGN PATENT DOCUMENTS

| | | | |
|---|---|---|---|
| WO | WO 2020164063 A1 | 8/2020 | |
| WO | WO 2022/036625 A1 | 2/2022 | |
| WO | WO 2022021362 A1 | 2/2022 | |
| WO | WO 2022/055816 A1 | 3/2022 | |
| WO | WO 2022/056819 A1 | 3/2022 | |
| WO | WO 2022/250511 A1 | 12/2022 | |

OTHER PUBLICATIONS

ZTE, "Discussion of subband non-overlapping full duplex," 3GPP TSG RAN WG1 #110bis-e, e-Meeting, Oct. 10-19, 2022, R1-2208484; 14 pages.

International Search Report and Written Opinion of the International Searching Authority directed to International Patent Application No. PCT/US2023/075788, mailed Feb. 12, 2024, 13 pages.

International Search Report and Written Opinion directed to International Application No. PCT/US2023/078352, mailed Feb. 20, 2024; 13 pages.

"5G; NR; Physical layer procedures for control (3GPP TS 38.213 version 16.2.0 Release 16)," ETSI TS 138 213 V16.2.0 (Jul. 2020), Jul. 2020, 180 pages.

3rd Generation Partnership Project Technical Specification Group Radio Access Network, 3GPP TS 38.214 V16.11.0, (Sep. 2022), 175 pages.

* cited by examiner

300

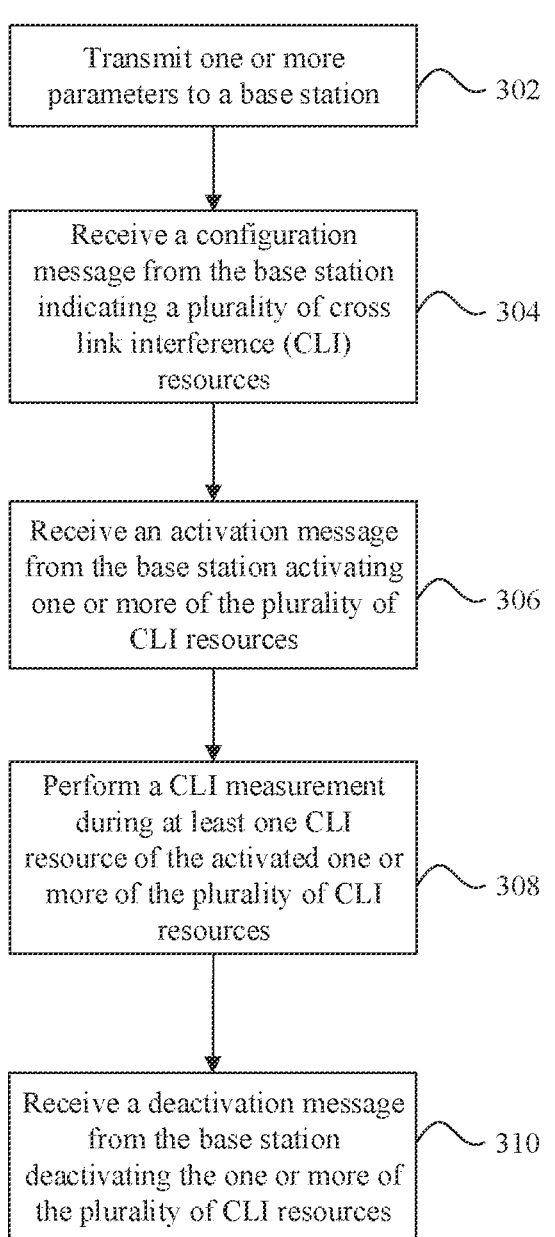

Transmit one or more parameters to a base station — 302

Receive a configuration message from the base station indicating a plurality of cross link interference (CLI) resources — 304

Receive an activation message from the base station activating one or more of the plurality of CLI resources — 306

Perform a CLI measurement during at least one CLI resource of the activated one or more of the plurality of CLI resources — 308

Receive a deactivation message from the base station deactivating the one or more of the plurality of CLI resources — 310

Transmit a configuration request message to the base station — 502

Receive a configuration message from the base station — 504

Transmit an activation request message to the base station — 506

Receive an activation message from the base station — 508

600

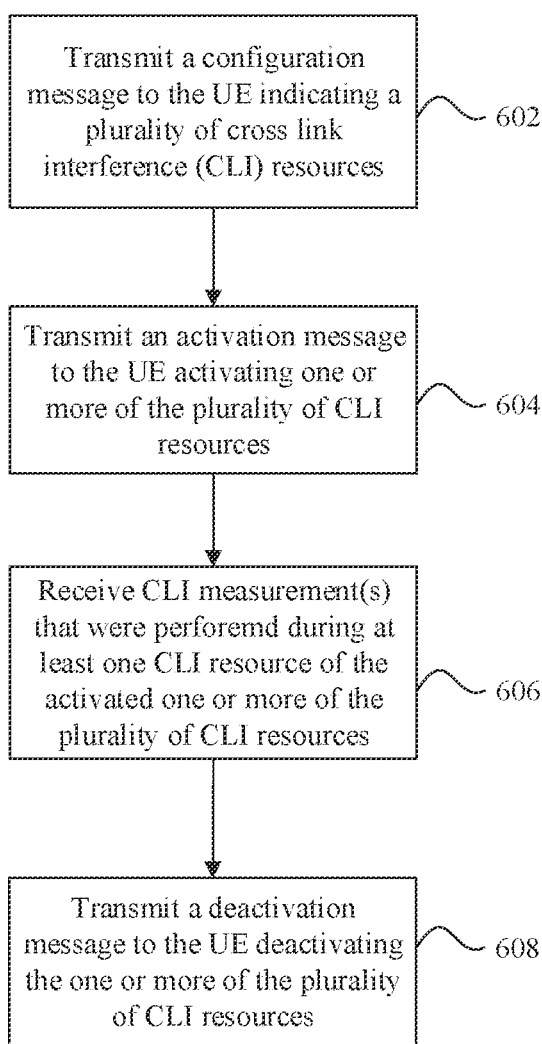

Transmit a configuration
message to the UE indicating a
plurality of cross link
interference (CLI) resources
— 602

Transmit an activation message
to the UE activating one or
more of the plurality of CLI
resources
— 604

Receive CLI measurement(s)
that were perforemd during at
least one CLI resource of the
activated one or more of the
plurality of CLI resources
— 606

Transmit a deactivation
message to the UE deactivating
the one or more of the plurality
of CLI resources
— 608

*FIG. 6*

CROSS LINK INTERFERENCE (CLI) CONFIGURATION AND MEASUREMENT

CROSS-REFERENCE TO RELATED APPLICATIONS

The present application claims the benefit of U.S. Provisional Patent Application No. 63/421,812, filed on Nov. 2, 2022, which is incorporated by reference herein in its entirety.

BACKGROUND

Field

The described aspects generally relate to mechanisms for cross link interference (CLI) resource configuration and CLI measurement.

Related Art

A wireless network, for example, one compliant with $3^{rd}$ Generation Partnership Project (3GPP) standards, can include many electronic devices, such as a first user equipment (UE) and a first base station (BS). The first BS can transmit on a downlink (DL) to the first UE and the first UE can transmit on an uplink (UL) to the first BS. In some situations, the wireless network can include a second UE that is transmitting on the UL to the first BS while the first UE is receiving on the DL, which may cause cross-link interference (CLI) between the second UE and the first UE. In other situations, the wireless network can include a second BS that is transmitting on the DL while the first BS is receiving on the UL which may cause (CLI) between the first BS and the second BS. Because of the large transmit power discrepancy between UL and DL, and/or propagation conditions, CLI can be detrimental to performance of the wireless network.

SUMMARY

Some aspects of this disclosure relate to apparatuses and methods for implementing cross link interference (CLI) measurement indication. According to some aspects, the CLI measurement indication can include, but is not limited to, CLI resource configuration, CLI resource activation, CLI resource deactivation, and on demand CLI resource configuration and activation.

Some aspects of this disclosure relate to a user equipment (UE). The UE includes a transceiver configured to enable wireless communication with a base station and a processor communicatively coupled to the transceiver. The processor can be configured to receive, using the transceiver, a configuration message from the base station indicating a plurality of cross link interference (CLI) resources. The processor is further configured to receive, using the transceiver, an activation message from the base station activating one or more of the plurality of CLI resources. The processor is further configured to perform a CLI measurement during at least one CLI resource of the activated one or more of the plurality of CLI resources.

In some aspects, the configuration message includes a Radio Resource Control (RRC) message including CLI resource configuration for indicating the plurality of CLI resources.

In some aspects, the CLI resource configuration includes a time domain CLI resource configuration indicating a plurality of slots and a plurality of symbols within each of the plurality of slots for the plurality of CLI resources, a frequency domain CLI resource configuration indicating a starting physical resource block (PRB), a number of occupied PRB for the plurality of CLI resources, and a beam configuration indicating one or more receive beams for the plurality of CLI resources.

In some aspects, the plurality of CLI resources includes a first CLI resource set and a second CLI resource set. The first CLI resource set includes first CLI resources of the plurality of CLI resources and is associated with a first CLI resource set index. The second CLI resource set includes second CLI resources of the plurality of CLI resources and is associated with a second CLI resource set index. The CLI resource configuration includes a first CLI resource configuration part associated with the first CLI resource set and a second CLI resource configuration part associated with the second CLI resource set.

In some aspects, the first CLI resource set index is used for activating and deactivating the first CLI resources of the first CLI resource set and the second CLI resource set index is used for activating and deactivating the second CLI resources of the second CLI resource set.

In some aspects, the configuration message includes a number of the plurality of the CLI resources configured per an active bandwidth part (BWP) within a sub-band full-duplex (SBFD) symbol. The configuration message can further include a maximum number of CLI resource sets per the active BWP within the SBFD symbol. The number of the plurality of the CLI resources and the maximum number of CLI resource sets are based on UE capability.

In some aspects, each of the plurality of CLI resources is associated with a CLI resource index and wherein each CLI resource index is used for activating and deactivating its associated CLI resource.

In some aspects, the configuration message includes a Radio Resource Control (RRC) message and the RRC message includes CLI resource configuration for indicating the plurality of CLI resources.

In some aspects, the activation message includes a downlink (DL) Medium Access Control (MAC) Control Element (MAC-CE). The DL MAC-CE includes CLI resource indexes of the activated one or more of the plurality of CLI resources or CLI resource set indexes of CLI resource sets associated with the activated one or more of the plurality of CLI resources. The processor is further configured to transmit, using the transceiver, an acknowledgment message to the base station during a first slot. The processor is further configured to perform the CLI measurement during at least one CLI resource of the activated one or more of the plurality of CLI resources, the at least one CLI resource being during a second slot, and the second slot being a predetermined number of slots after the first slot.

In some aspects, the activation message includes a UE-specific Downlink Control Information (DCI) or a group common DCI (GC-DCI). The processor can further be configured to receive the UE-specific DCI or the GC-DCI with a cyclic redundancy check (CRC) scrambled with a CLI Radio Network Temporary Identifier (RNTI), validate one or more fields of the UE-specific DCI or the GC-DCI, and determine the activated one or more of the plurality of CLI resources.

In some aspects, a Hybrid Automatic Repeat Request (HARD) acknowledgment (HARQ-ACK) bit field of the UE-specific DCI or the GC-DCI maps to a CLI resource index or to a CLI resource set index. Additionally, or alternatively, a Modulation and Coding Scheme (MCS) bit field of the UE-specific DCI or the GC-DCI maps to the CLI resource index or to the CLI resource set index. Additionally, or alternatively, a bit field of the UE-specific DCI or the GC-DCI different from the HARQ-ACK bit field and the MCS bit field maps to the CLI resource index or to the CLI resource set index.

In some aspects, the activation message includes one or more of a Sounding Reference Signal (SRS) request bit field or a Channel State Information (CSI) request bit field are used to determine the activated one or more of the plurality of CLI resources.

In some aspects, the processor is further configured to receive, using the transceiver, a deactivation message from the base station deactivating the one or more of the plurality of CLI resources.

In some aspects, the deactivation message includes a downlink (DL) Medium Access Control (MAC) Control Element (MAC-CE). Alternatively, the deactivation message includes a UE-specific Downlink Control Information (DCI) or a group common DCI (GC-DCI). Alternatively, the deactivation message includes one or more of a Sounding Reference Signal (SRS) request bit field or a Channel State Information (CSI) request bit field.

In some aspects, the processor is further configured to deactivate the one or more of the plurality of CLI resources based on threshold for deactivation in the configuration message.

In some aspects, the processor is further configured to transmit, to a second UE, a signal during another CLI resource of the activated one or more of the plurality of CLI resources. The second UE is configured to perform CLI measurement during the other CLI resource of the activated one or more of the plurality of CLI resources.

In some aspects, the configuration message includes a parameter indicating whether the activated one or more of the plurality of CLI resources is used for CLI measurement or for transmitting the signal.

In some aspects, the processor is further configured to transmit a configuration request message to the base station for configuring a second plurality of CLI resources. The processor is further configured to receive a second configuration message from the base station in response to the configuration request message. The processor is further configured to transmit an activation request message to the base station for activating one or more of the second plurality of CLI resources. The activation request message is based on Layer 1 signaling or is based on Layer 2 signaling. The processor is further configured to receive an activation message from the base station activating a subset of the one or more of the second plurality of CLI resources.

Some aspects of this disclosure relate to a method performed by a user equipment (UE) including receiving a configuration message from a base station indicating a plurality of cross link interference (CLI) resources and receiving an activation message from the base station activating one or more of the plurality of CLI resources. The activation message is based on Layer 1 signaling or Layer 2 signaling. The method can further include performing a CLI measurement during at least one CLI resource of the activated one or more of the plurality of CLI resources.

Some aspects of this disclosure relate to a non-transitory computer-readable medium storing instructions. When the instructions are executed by a processor of a user equipment (UE), the instructions cause the UE to perform operations receiving a configuration message from a base station indicating a plurality of cross link interference (CLI) resources and receiving an activation message from the base station activating one or more of the plurality of CLI resources. The activation message is based on Layer 1 signaling or Layer 2 signaling. The operations can further include performing a CLI measurement during at least one CLI resource of the activated one or more of the plurality of CLI resources.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 3 illustrates an example method for a system (for example, a UE) performing CLI resource configuration and CLI measurement, according to some aspects of the disclosure.

FIG. 6 illustrates an example method for a system (for example, a BS) implementing the CLI measurement indication, according to some aspects of the disclosure.

DETAILED DESCRIPTION

Some aspects of this disclosure relate to apparatuses and methods for implementing cross link interference (CLI) measurement indication. According to some aspects, the CLI measurement indication can include, but is not limited to, CLI resource configuration, CLI resource activation, CLI resource deactivation, and on demand CLI resource configuration and activation.

As discussed in more detail below, the systems, methods, and apparatuses of this disclosure can configure one or more CLI resources for a user equipment (UE) to perform CLI measurements and/or to transmit signals so another UE can perform CLI measurements. Additionally, the systems, methods, and apparatuses of this disclosure can activate the CLI measurements (and/or signal transmissions) by the UE at the CLI resource(s). In some aspects, the activation can be done by Layer 1 signaling, for example, Downlink Control Information (DCI) on a Physical Downlink Control Channel (PDCCH) or by Layer 2 signaling, for example, downlink (DL) Media Access Control-Control Element (MAC-CE) on Physical Downlink Shared Channel (PDSCH).

Additionally, or alternatively, the systems, methods, and apparatuses of this disclosure can deactivate the CLI measurements (and/or signal transmissions) by the UE at the CLI resource(s). In some aspects, the deactivation can be done by Layer 1 signaling, for example, DCI on a PDCCH or by Layer 2 signaling, for example, DL MAC-CE on PDSCH.

Additionally, or alternatively, the systems, methods, and apparatuses of this disclosure can perform on demand CLI resource configuration and/or activation, where the UE can request for the CLI resource configuration and/or activation.

In some examples, the aspects of this disclosure can be performed by a network and/or a UE that operates according to $5^{th}$ generation (5G) and/or $6^{th}$ generation (6G) wireless technology for digital cellular networks as defined by $3^{rd}$ Generation Partnership Project (3GPP). Additionally, or alternatively, the aspects of this disclosure can be performed by a network and/or a UE that operates according to the Release 15 (Rel-15), Release 16 (Rel-16), Release 17 (Rel-17), Rel-17 new radio (NR), Release 18 (Rel-18), Release 19 (Rel-19) or others. However, the aspects of this disclosure are not limited to these examples, and one or more mechanisms of this disclosure can be implemented by other network(s) and/or UE(s) for CLI measurement indication.

Figure 1A:
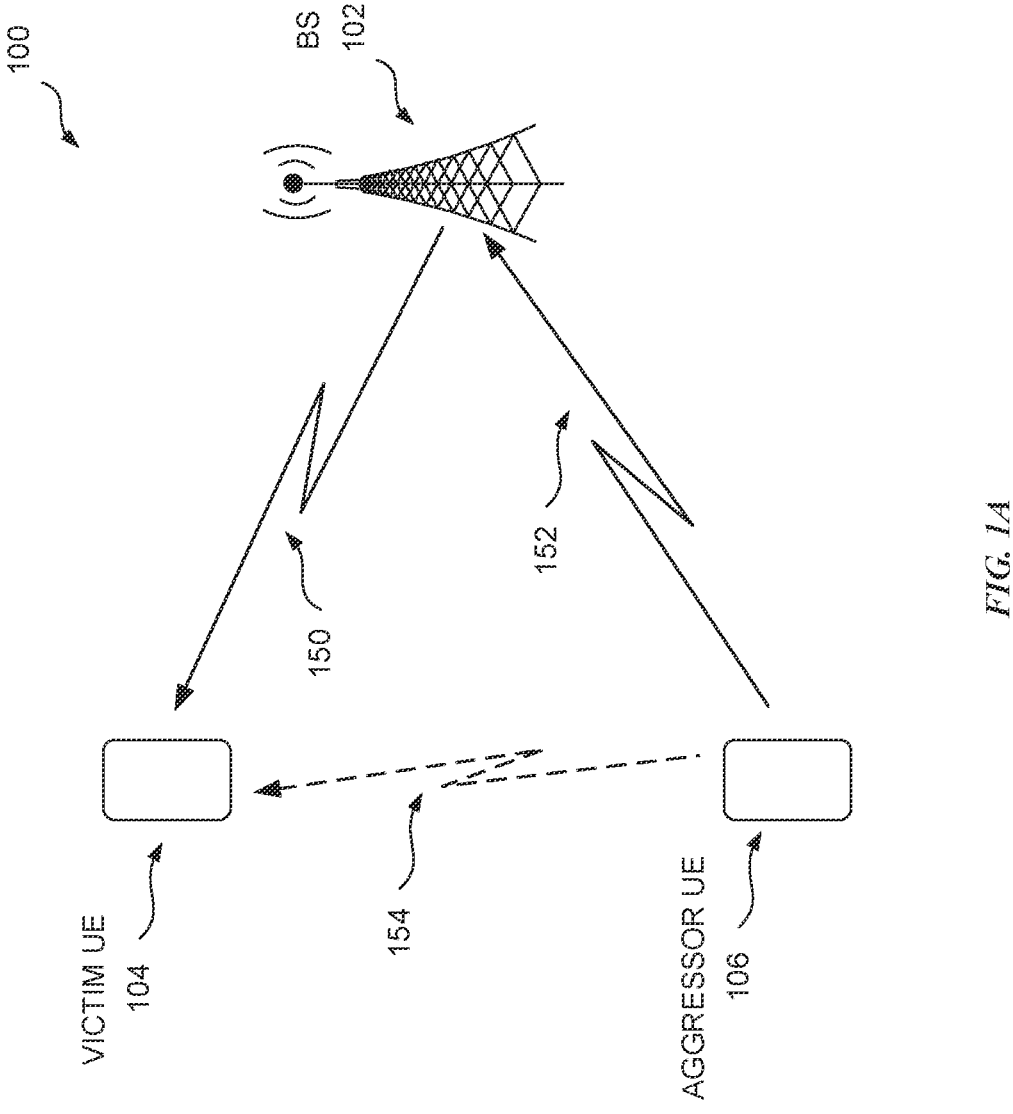
FIG. 1A illustrates an example system implementing CLI measurement indication, according to some aspects of the disclosure.
Figure 1B:
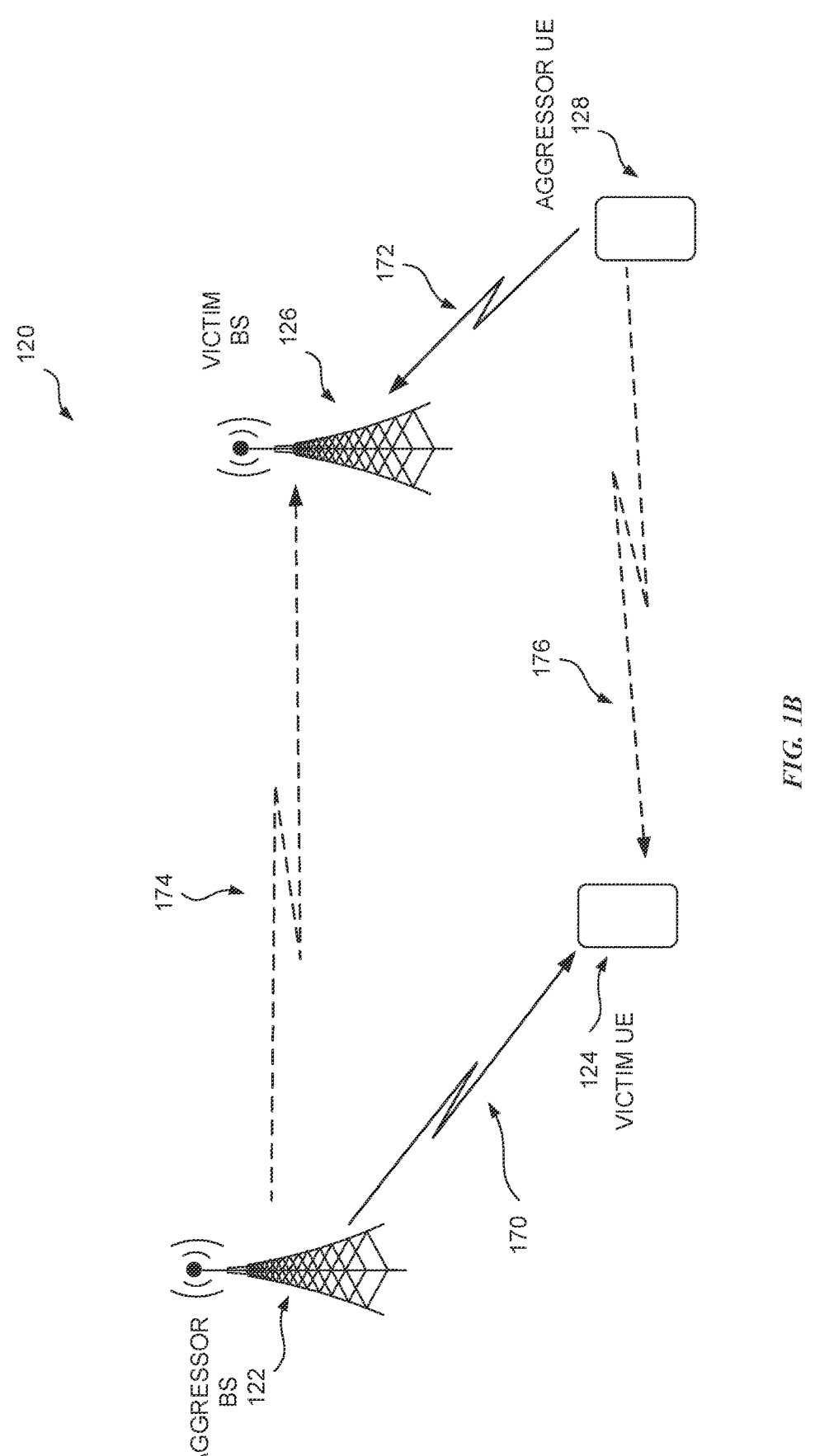
FIG. 1B illustrates another example system implementing CLI measurement indication, according to some aspects of the disclosure.

FIGS. 1A and 1B illustrate example systems 100 and 120 implementing CLI measurement indication, according to some aspects of the disclosure. Example systems 100 and 120 are provided for the purpose of illustration only and does not limit the disclosed aspects.

In the exemplary aspects illustrated in FIG. 1A, system 100 (e.g., a first wireless network) can includes a network node (for example, a base station (BS) such as eNBs, gNBs, and the like) 102, a victim electronic device (for example, a UE) 104, and an aggressor electronic device (for example, a UE) 106. As illustrated in FIG. 1A, the BS 102 can transmit on a downlink (DL) 150 to the victim UE 104. As used herein, the terms "downlink," DL, or the like refer to a first (signal) direction from a BS, such as the BS 102 to provide an example, to a UE, such as the victim UE 104 to provide an example. The DL 150 can include one or more downlink communication channels, for example, a Physical Downlink Control Channel (PDCCH) and/or a Physical Downlink Shared Channel (PDSCH). The PDCCH represents a downlink channel that carries control information between the BS 102 and the victim UE 104. And the PDSCH represents a downlink channel that carries data information between the BS 102 and the victim UE 104. And as illustrated in FIG. 1A, the BS 102 receives on an uplink (UL) 152 from the aggressor UE 106. As used herein, the terms "uplink," UL, or the like refers to a second (signal) direction from a UE, such as the aggressor UE 106 to provide an example, to a BS, such as the BS 102 to provide an example. The UL 152 can include one or more uplink communication channels, for example, a Physical Uplink Control Channel (PUCCH) and/or a Physical Uplink Shared Channel (PUSCH). The PDCCH represents an uplink channel that carries control information between the aggressor UE 106 and the BS 102. And the PUSCH represents an uplink channel that carries data information between aggressor UE 106 and the BS 102. In some aspects, the aggressor UE 106 can transmit on the UL 152 while the victim UE 104 is receiving on the DL 150, which may cause CLI 154 in the system 100 between the aggressor UE 106 and the victim UE 104.

In the exemplary aspects illustrated in FIG. 1B, system 120 (e.g., a second wireless network) can includes network nodes (for example, a base stations such as eNBs, gNBs, and the like) 122 and 126, a victim electronic device (for example, a UE) 124, and an aggressor electronic device (for example, a UE) 126. As illustrated in FIG. 1B, the second wireless network 120 includes an aggressor BS 122, a first UE 124, a victim BS 126, and a second UE 128. As illustrated in FIG. 1B, the aggressor BS 122 can transmit on a DL 170 to the victim UE 124. The DL 170 can include one or more downlink communication channels, for example, the PDCCH and/or the PDSCH. The PDCCH represents a downlink channel that carries control information between the aggressor BS 122 and the victim UE 124. And the PDSCH represents a downlink channel that carries data information between the aggressor BS 122 and the victim UE 124. And as illustrated in FIG. 1B, the victim BS 126 can receive on a UL 172 from the aggressor UE 128. The UL 172 can include one or more uplink communication channels, for example, the PUCCH and/or the PUSCH. The PUCCH represents an uplink channel that carries control information between the aggressor UE 128 and the victim BS 126. And the PUSCH represents an uplink channel that carries data information between the aggressor UE 128 and the victim BS 126.

In some aspects, the aggressor BS 122 can transmit on the DL 170 while the victim BS 126 is receiving on the UL 172 which may cause cross link interference (CLI) 174, in the system 120 between the aggressor BS 122 and the victim BS 126. Similarly, in some aspects, the aggressor UE 128 can transmit on the UL 172 while the victim UE 124 is receiving on the DL 170 which may cause CLI 176 in the system 200 between the victim UE 124 and the aggressor UE 128.

The system 100 and the system 120 can be configured to operate based on a wide variety of wireless communication techniques. These techniques can include, but are not limited to, techniques based on $3^{rd}$ Generation Partnership Project (3GPP) standards. In some aspects, the BS 102, the aggressor BS 122, and/or the victim BS 126 can include one or more Next Generation Node BSs (gNBs), one or more radio access nodes (RANs), one or more evolved NodeBs (eNBs), one or more NodeBs, one or more Road Side Units (RSUs), one or more Transmission Reception Points (TRxPs or TRPs), and/or the like. In these aspects, the BS 102, the aggressor BS 122, and/or the victim BS 126 can include one or more nodes configured to operate based on a wide variety of wireless communication techniques such as, but not limited to, techniques based on 3GPP standards. For example, the BS 102, the aggressor BS 122, and/or the victim BS 126 can include one or more nodes configured to operate using Rel-15, Rel-16, Rel-17, Rel-18, Rel-19, or others.

In some aspects, the victim UE 104, the aggressor UE 106, the victim UE 124, and/or the aggressor UE 128 can include one or more consumer electronics devices, one or more cellular phones, one or more smartphones, one or more feature phones, one or more tablet computers, one or more wearable computer devices, one or more personal digital assistants (PDAs), one or more pagers, one or more wireless handsets, one or more desktop computers, one or more laptop computers, one or more in-vehicle infotainments (IVIs), one or more in-car entertainment (ICEs) devices, one or more Instrument Clusters (ICs), one or more head-up display (HUD) devices, one or more onboard diagnostic (OBD) devices, one or more dashtop mobile equipments (DMEs), one or more mobile data terminals (MDTs), one or more Electronic Engine Management Systems (EEMSs), one or more electronic/engine control units (ECUs), one or more electronic/engine control modules (ECMs), one or more embedded systems, one or more microcontrollers, one or more control modules, one or more engine management systems (EMSs), one or more networked or "smart" appliances, one or more Machine-Type-Communication (MTC) devices, one or more Machine-to-Machine (M2M) devices, one or more Internet of Things (IoT) devices, and the like. In these aspects, the victim UE 104, the aggressor UE 106, the victim UE 124, and/or the aggressor UE 124 can be configured to operate based on a wide variety of wireless communication techniques such as, but not limited to, techniques based on 3GPP standards. For example, the victim UE 104, the aggressor UE 106, the victim UE 124, and/or the aggressor UE 124 can be configured to operate using Rel-15, Rel-16, Rel-17, Rel-18, Rel-19, or others.

Because of the large transmit power discrepancy between UL and DL, for example, between the DL 150 and the UL 152 and/or between the DL 170 and the UL 172, and/or propagation conditions, CLI can be detrimental to performance of the system 100 and/or the system 120. The CLI within the system 100 and/or the system 120 can be measured and reported by the victim UE 104 and/or the aggressor UE 104 as illustrated in FIG. 1A, by the victim UE 124 and/or the aggressor UE 128 as illustrated in FIG. 1B, and/or the aggressor BS 122 and/or the victim BS 126 as illustrated in FIG. 1B. Although the discussion of measuring and reporting the CLI within the wireless network is to be described below in terms of measuring and reporting by the victim UE 104, those skilled in the relevant art(s) will recognize that the aggressor UE 106, the victim UE 124, the aggressor UE 128, the aggressor BS 122, and/or the victim BS 126 can measure and report the CLI within the wireless network in a substantially similar manner as the victim UE 104 without departing from the spirit and scope of the present disclosure The BS 102 and the victim UE 104 can undergo a handshaking procedure to negotiate CLI measurement indication. According to some aspects, the CLI measurement indication can include, but is not limited to, CLI resource configuration, CLI resource activation, CLI resource deactivation, and on demand CLI resource configuration and activation. As part of this handshaking procedure, the BS 102 can send a CLI measurement configuration within the system 100 to indicate one or more BSs and/or UEs within the system 100, such as the victim UE 104, are to measure and to report the CLI measurements to the BS 102.

According to some aspects, the BS 102 transmits CLI resource configuration to the victim UE 104. The CLI resource configuration include parameters for indicating resources (in time, frequency, and/or beam indication) that the victim UE 104 can use to perform CLI measurements and/or to transmit signals such that the aggressor UE 106 can perform CLI measurements. In some aspects, the CLI measurements can include a CLI-Reference Signal Received Power (CLI-RSRP), a CLI-Received Signal Strength Indicator (CLI-RSSI), a CLI-Reference Signal Received Quality (CLI-RSRQ), a CLI-Signal-to-Interference-Plus-Noise Ratio (CLI-SINR), or the like to provide some examples.

According to some aspects, the CLI resources can be configured by Radio Resource Control (RRC). The RRC protocol can include, but is not limited to, connection establishment functions, connection release functions, transmitting system information, radio bearer establishment, reconfiguration functions, release functions, or the like. For example, the CLI resources can be configured during the RRC reconfiguration. For example, the CLI resources can be configured during the steps in establishing Radio Connection between the BS 102 and the victim UE 104.

According to some aspects, a number (e.g., M) of the CLI resources can be configured per active bandwidth part (BWP) within a sub-band full-duplex (SBFD) symbol. The number (e.g., M) of CLI resources can be determined based on the victim UE 104 capability.

According to some aspects, the CLI resource configuration can include time domain configuration, frequency domain configuration, and/or beam indication. For example, the victim UE 104 can receive a configuration message (such as, but not limited to, an RRC message) from the BS 102. The configuration message can include one or more parameters indicating the CLI resource configuration. The one or more parameters indicating the CLI resource configuration can include parameter(s) for time domain configuration, frequency domain configuration, and/or beam indication.

According to some aspects, the parameter(s) for the time domain configuration can indicate whether the CLI resources are periodic or aperiodic. If the CLI resources are periodic, then parameter(s) for the time domain configuration can indicate the periodicity of the CLI resources. For example, the parameter(s) for the time domain configuration can indicate whether a CLI resource can be associated to a specific duration (number of slots) or it can be repeated periodically once the CLI resource is activated (e.g., triggered). Additionally, or alternatively, the parameter(s) for the time domain configuration can indicate at which slots and which symbols within that slot the CLI measurement is expected.

According to some aspects, the parameter(s) for the frequency domain configuration can indicate a starting physical resource block (PRB). Additionally, the parameter(s) for the frequency domain configuration can indicate the number of occupied PRBs. The parameter(s) for the frequency domain configuration can also indicate whether the resource in the frequency domain are contiguous or the follow a bitmap. The parameter(s) for the frequency domain configuration can also indicate whether the CLI resource follows a comb pattern (e.g., every other tone or every $4^{th}$ tone) per allocated PRB. The parameter(s) for the frequency domain configuration can also indicate whether cyclic shift is applied for the CLI resources.

According to some aspects, the parameter(s) for the beam indication can indicate the beam(s) (e.g., receiving (Rx) beam(s)) that are used for the CLI measurement during the CLI resource. In some examples, each CLI resource can be associated with a specific Rx beam that is separate and different from Rx beams for the other CLI resources (e.g., Quasi Co Location (QCL) type D). In some examples, some or all of the CLI resource can be associated with the same Rx beam. According to some aspects, the victim UE 104 can sweep over different Rx beams during the CLI resource for the CLI measurement. In this example, the victim UE 104 can determine which Rx beam is associated with minimum CLI measurement.

It is noted that although exemplary parameters are provided for the time domain configuration, the frequency domain configuration, and the beam indication, the aspects of this disclosure are not limited to these examples, and other parameters can be used.

Also, although some examples of this disclosure are discussed with respect to the victim UE 104 using the CLI resources for CLI measurements, the victim UE 104 can transmit a signal (for example, but not limited to a Sounding Reference Signal (SRS)) during one or more of the CLI resources to the aggressor UE 106. In these examples, the aggressor UE 106 can use the one or more of the CLI resources to perform CLI measurements.

The configuration message can further indicate whether the one or more parameters indicating the CLI resource configuration are for a CLI resource set or for individual CLI resources. As discussed above, the one or more parameters indicating the CLI resource configuration can include parameter(s) for time domain configuration, frequency domain configuration, and/or beam indication. The configuration message can further indicate whether the parameter(s) for time domain configuration, frequency domain configuration, and/or beam indication are for a CLI resource set or for individual CLI resources.

According to some aspects, the CLI resources can be grouped in one or more CLI resource sets. In these examples, each CLI resource set can include multiple CLI resources. In some examples, the number of CLI resources in the CLI resource sets can be the same across the CLI resource sets. In some examples, the number of CLI resources in the CLI resource sets can be different across the CLI resource sets.

According to some aspects, the parameter(s) for time domain configuration, frequency domain configuration, and/or beam indication can be the same for the CLI resources within one CLI resource set. In these examples, the parameter(s) for time domain configuration, frequency domain configuration, and/or beam indication can be different across different CLI resource sets. For example, a CLI resource set can include multiple CLI resources with the same Sub carrier Spacing (SCS), timing behavior (e.g., periodic or aperiodic), or the like. Different CLI resource sets may have different periodicities, SCS, or the like.

According to some aspects, the activation (e.g., triggering) and/or the deactivation of CLI resources for performing CLI measurement can be per CLI resource set. In these examples, when a CLI resource set is activated/triggered (or deactivated), all CLI resources within the CLI resource set are activated/triggered (or deactivated). According to some aspects, each CLI resource set can be associated with an identifier (ID) such as CLI resource set index to identify the CLI resource set. The CLI resource set index can be used by the BS 102 to activate or deactivate the CLI resource set associated with the CLI resource set index. When the CLI resource set associated with the CLI resource set index is activated or deactivated, the CLI resources within the CLI resource set are activated or deactivated.

As discussed above, the number (e.g., M) of the CLI resources that can be configured per active BWP within a SBFD symbol can be determined based on the victim UE 104 capability. Similarly, the maximum number (e.g., N) of the CLI resource sets that can be configured per active BWP within a SBFD symbol can be determined based on the victim UE 104 capability. In some examples, the victim UE 104 can communicate these numbers (e.g., M and N) to the BS 102 using one or more messages sent by the victim UE 104 to the BS 102. For example, during the initial connection establishment, the victim UE 104 can communicate its capabilities to BS 102. Also, a maximum number (e.g., P) of CLI resources per a CLI resource set can be based on the victim UE 104 capability and can be communicated to the BS 102. Additionally, or alternatively, the network (e.g., the system 100) can set these numbers (e.g., M, N, P) and communicate them to the victim UE 104 (and/or other UEs in the network).

In some aspects, the CLI resource configuration are for individual CLI resources. For example, the parameter(s) for time domain configuration, frequency domain configuration, and/or beam indication are for individual CLI resources. The configuration message can indicate that the one or more parameters indicating the CLI resource configuration are for the individual CLI resources. According to some aspects, each CLI resource can be associated with an identifier (ID) such as CLI resource index to identify the CLI resource. The CLI resource index can be used by the BS 102 to activate or deactivate the CLI resource associated with the CLI resource index.

According to some aspects, in addition to configuring the CLI resources for the victim UE 104, the BS 102 can activate or deactivate the CLI resources. Activating the CLI resources can include triggering the victim UE 104 to perform CLI measurement during the activated CLI resource. Deactivating the CLI resource can include requesting the victim UE 104 to stop performing CLI measurement during the deactivated CLI resource. Although some examples are discussed with respect to activating or deactivating CLI resources, the aspects of this disclosure include activating or deactivating individual CLI resources (e.g., using CLI resource index) and/or activating or deactivating CLI resource set (e.g., using CLI resource set index).

As discussed in more detail, BS 102 can indicate to the victim UE 104 which CLI resource(s) or resource set(s) are activated or deactivated using Layer 1 signaling, such as DCI on the PDCCH to provide an example, and/or Layer 2 signaling, such as a DL MAC-CE to provide an example. In some aspects, the DCI can provide the victim UE 104 with information, such as physical layer resource allocation, power control commands, and/or Hybrid Automatic Repeat Request (HARM) information to provide some examples. In these aspects, the DCI can be transmitted on the PDCCH in one or more DCI formats, such as DCI Format 0_0, DCI Format 0_1, DCI Format 1_0, DCI Format 1_1, DCI Format 2_0, DCI Format 2_1, DCI Format 2_2, and/or DCI Format 2_3 as outlined by the 3GPP standards to provide some examples.

In addition to, or alternative to, the BS 102 triggering transmission of the CLI resource configuration to the victim UE 104 and/or the BS 102 triggering the activation or deactivation of the CLI resources (or CLI resource sets), the victim UE 104 can request for the CLI resource configuration and/or for the activation or deactivation of the CLI resources (or CLI resource sets). As discussed in more detail below, the victim UE 104 can request for the activation or deactivation of the CLI resources (or CLI resource sets) using Layer 1 signaling, such as DCI on the PDCCH to provide an example, and/or Layer 2 signaling, such as a DL MAC-CE to provide an example.

Figure 2:
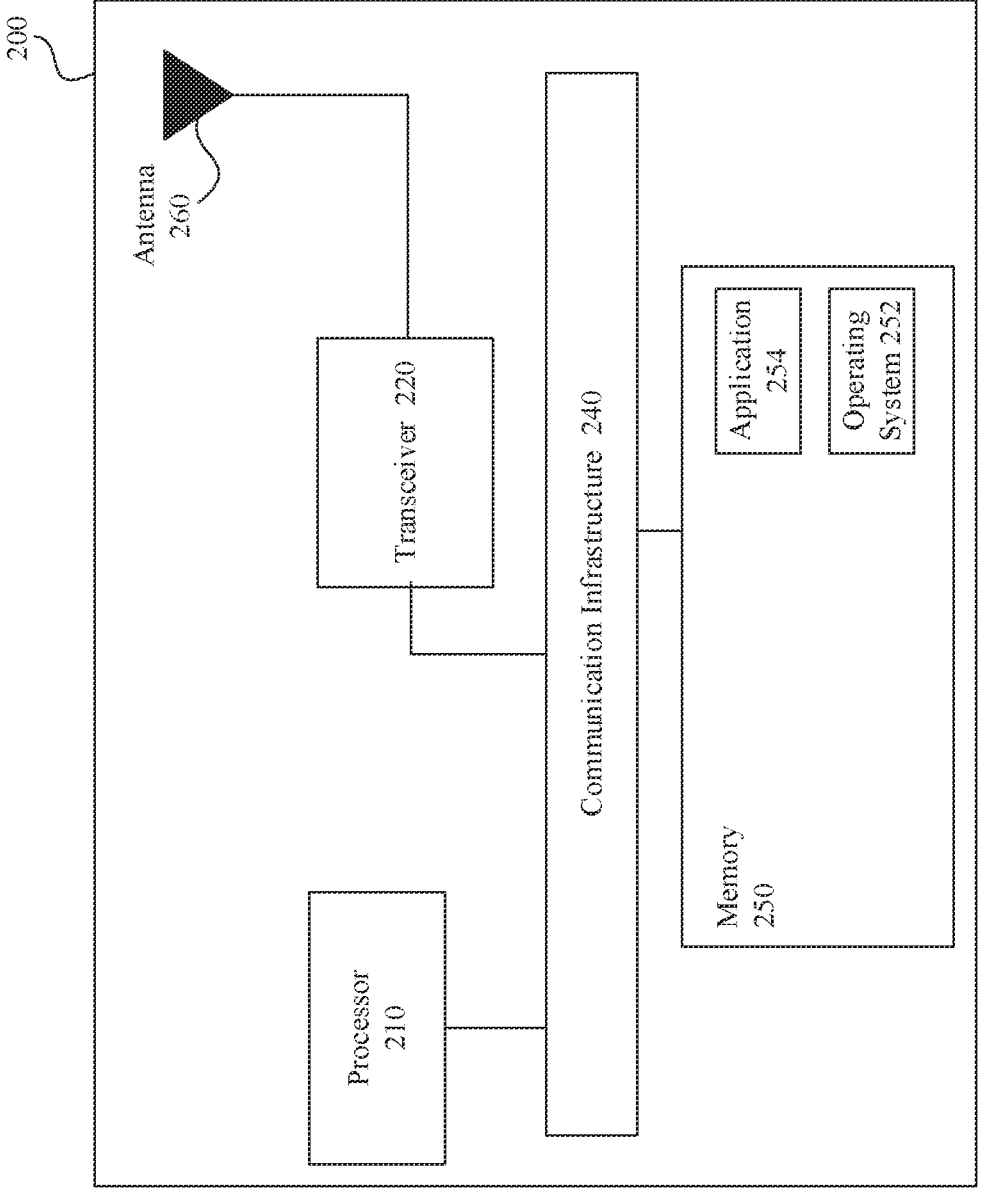
FIG. 2 illustrates a block diagram of an example system of an electronic device implementing CLI measurement indication, according to some aspects of the disclosure.

FIG. 2 illustrates a block diagram of an example system 200 of an electronic device implementing CLI measurement indication, according to some aspects of the disclosure. System 200 may be any of the electronic devices (e.g., the BS 102, the aggressor BS 122, the victim BS 126, the victim UE 104, the aggressor UE 106, the victim UE 124, the aggressor UE 128) of system 100 and/or system 120. System 200 includes a processor 210, one or more transceivers 220, a communication infrastructure 240, a memory 250, operating system 252, application 254, and/or an antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components. Also, system 200 of the aspects of this disclosure can include any number of processors, transceivers, communication infrastructures, memories, operating systems, applications, and antennas.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 can be stored in memory 250. The operating system 252 can manage transfer of data between the memory 250, one or more applications 254, the processor 210, and/or one or more transceivers 220. In some examples, the operating system 252 maintains one or more network protocol stacks (e.g., Internet protocol stack, cellular protocol stack, and the like) that can include a number of logical layers. At corresponding layers of the protocol stack, the operating system 252 includes control mechanism and data structures to perform the functions associated with that layer.

According to some examples, the application 254 can be stored in the memory 250. The application 254 can include applications (e.g., user applications) used by wireless system 200 and/or a user of wireless system 200. The applications in the application 254 can include applications such as, but not limited to, radio streaming, video streaming, remote control, and/or other user applications.

System 200 can also include the communication infrastructure 240. The communication infrastructure 240 provides communication between, for example, the processor 210, the one or more transceivers 220, and the memory 250. In some implementations, the communication infrastructure 240 may be a bus. The processor 210 together with instructions stored in memory 250 performs operations enabling system 200 of systems 100 and/or 120 to implement CLI measurement indication, as described herein.

The one or more transceivers 220 transmit and receive communications signals that support the operations of system 200 including, but not limited to, CLI measurement indication, according to some aspects, and may be coupled to the antenna 260. The antenna 260 may include one or more antennas that may be the same or different types. The one or more transceivers 220 allow system 200 to communicate with other devices that may be wired and/or wireless. In some examples, the one or more transceivers 220 can include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects, the one or more transceivers 220 can include a cellular subsystem, a WLAN subsystem, and/or a Bluetooth™ subsystem, each including its own radio transceiver and protocol(s) as will be understood by those skilled arts based on the discussion provided herein. In some implementations, the one or more transceivers 220 can include more or fewer systems for communicating with other devices.

In some examples, the one or more transceivers 220 can include one or more circuits (including a WLAN transceiver) to enable connection(s) and communication over WLAN networks such as, but not limited to, networks based on standards described in IEEE 802.11. Additionally, or alternatively, the one or more transceivers 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, the one or more transceivers 220 can include one or more circuits (including a cellular transceiver) for connecting to and communicating on cellular networks. The cellular networks can include, but are not limited to, 3G/4G/5G/6G networks such as Universal Mobile Telecommunications System (UMTS), Long-Term Evolution (LTE), and the like. For example, the one or more transceivers 220a-220n can be configured to operate according to one or more of Rel-15, Rel-16, Rel-17, Rel-18, Rel-19, or other of the 3GPP standards.

According to some aspects, the processor 210, alone or in combination with computer instructions stored within the memory 250, and/or the one or more transceiver 220, implements CLI measurement indication, as discussed herein.

FIG. 3 illustrates an example method 300 for a system (for example, a UE) performing CLI resource configuration and CLI measurement, according to some aspects of the disclosure. As a convenience and not a limitation, FIG. 3 may be described with regard to elements of FIGS. 1-2. Method 300 may represent the operation of an electronic device (for example, the victim UE 104 of FIG. 1A and/or the victim UE 124 of FIG. 1B) implementing the CLI measurement indication. Method 300 may also be performed by system 200 of FIG. 2 and/or computer system 700 of FIG. 7. But method 300 is not limited to the specific aspects depicted in those figures and other systems may be used to perform the method as will be understood by those skilled in the art. It is to be appreciated that not all operations may be needed, and the operations may not be performed in the same order as shown in FIG. 3.

Although method 300 is discussed with respect to a victim UE, the aspects of this disclosure are not limited to this example. For example, method 300 may be performed by an aggressor UE (e.g., the aggressor UE 106 of FIG. 1A and/or the aggressor UE 128 of FIG. 1B). Additionally, or alternatively, method 300 may be performed by a victim BS (e.g., the victim BS 126 of FIG. 1B).

At 302, one or more parameters are transmitted to a base station. For example, the UE can transmit one or more parameters to the base station (e.g., BS 102 of FIG. 1A). According to some aspects, the one or more parameters can include, but are not limited to, the number (e.g., M) of the CLI resources per active BWP within a SBFD symbol that the UE can support. Additionally, or alternatively, the one or more parameters can include the maximum number (e.g., N) of the CLI resource sets per active BWP within the SBFD symbol that the UE can support. Additionally, or alternatively, the one or more parameters can include the maximum number (e.g., P) of CLI resources per a CLI resource set that the UE can support. According to some aspects, the UE can send a message to the base station during the initial connection establishment where the message can include these parameters.

At 304, a configuration message is received from the base station indicating a plurality of CLI resources. For example, the UE can receive the configuration message from the base station that indicates the plurality of CLI resources. According to some aspects, the UE can receive the configuration message during the initial configuration. For example, the configuration message can include an RRC message and the CLI resource configuration can be RRC configured. However, the aspects of this disclosure are not limited to these examples and the configuration message can include other messages that can configure the CLI resources at the UE.

According to some examples, indicating the plurality of CLI resources can further aspects, the configuration of the plurality of CLI resources can include indicating the CLI resources that can be used for CLI measurements and/or for transmitting signals to, for example, other UEs for CLI measurements. As discussed above, the CLI resource configuration can include time domain configuration, frequency domain configuration, and/or beam indication. For example, the configuration message can include one or more parameters indicating the CLI resource configuration. The one or more parameters indicating the CLI resource configuration can include parameter(s) for time domain configuration, frequency domain configuration, and/or beam indication.

According to some examples, the CLI resource configuration can include time domain CLI resource configuration indicating a plurality of slots and a plurality of symbols within each of the plurality of slots for the plurality of CLI resources. Additionally, or alternatively, the CLI resource configuration can include frequency domain CLI resource configuration indicating a starting physical resource block (PRB) and a number of occupied PRB to be used for the plurality of CLI resources. Additionally, or alternatively, the CLI resource configuration can include beam configuration one or more receive beams for the plurality of CLI resources.

According to some examples, the configuration message can further indicate whether the CLI resource configuration is for CLI resource sets or are for individual resources. In a non-limiting example, the CLI resources that are configured for the UE can include a first CLI resource set and a second CLI resource set. The first CLI resource set can include first CLI resource(s) and can be associated with a first CLI resource set index. The second CLI resource set can include second CLI resource(s) and can be associated with a second CLI resource set index. In this example, the CLI resource configuration in the configuration message can include a first CLI resource configuration part associated with the first CLI resource set and a second CLI resource configuration part associated with the second CLI resource set.

According to some aspects, the first CLI resource set index can be used for activating and deactivating the first CLI resources of the first CLI resource set. The second CLI resource set index can be used for activating and deactivating the second CLI resources of the second CLI resource set.

Additionally, or alternatively, each of the CLI resources that are configured at the UE can be associated with a CLI resource index. In these examples, each CLI resource index can be used for activating and deactivating its associated CLI resource.

At 306, an activation message is received from the base station activating (e.g., triggering) one or more of the plurality of CLI resources. For example, the UE can receive the activation message from the base station. The activation message can be used to activate one or more of the plurality of CLI resources. According to some examples, the activation message can activate one or more individual CLI resources using corresponding CLI resource indexes. Additionally, or alternatively, the activation message can activate one or more CLI resource sets using corresponding CLI resource set indexes.

According to some aspects, the UE can perform CLI measurements using the activated (e.g., triggered) CLI resources. Additionally, or alternatively, the UE can transmit one or more signals to, for example, another UE using the activated (e.g., triggered) CLI resources such that the other UE can perform CLI measurements.

According to some aspects, the UE can receive the activation message using Layer 1 signaling, such as DCI on the PDCCH to provide an example, and/or Layer 2 signaling, such as a DL MAC-CE to provide an example.

For example, the activation message can be provided by Layer 2 signaling, such as the DL MAC-CE. In some examples, the DL MAC-CE can include CLI resource indexes corresponding to the activated one or more CLI resources. Additionally, or alternatively, the DL MAC-CE can include the CLI resource set indexes corresponding to CLI resource sets associated with the activated one or more of CLI resources. In these examples, after receiving the activation message, the UE can transmit an acknowledgment message to the base station during a first slot. Then, the UE can perform the CLI measurement (or transmit a signal) during at least one CLI resource of the activated one or more CLI resources. The at least one CLI resource can be during a second slot where the second slot can be a predetermined number of slots occurring after the first slot.

Figure 4:
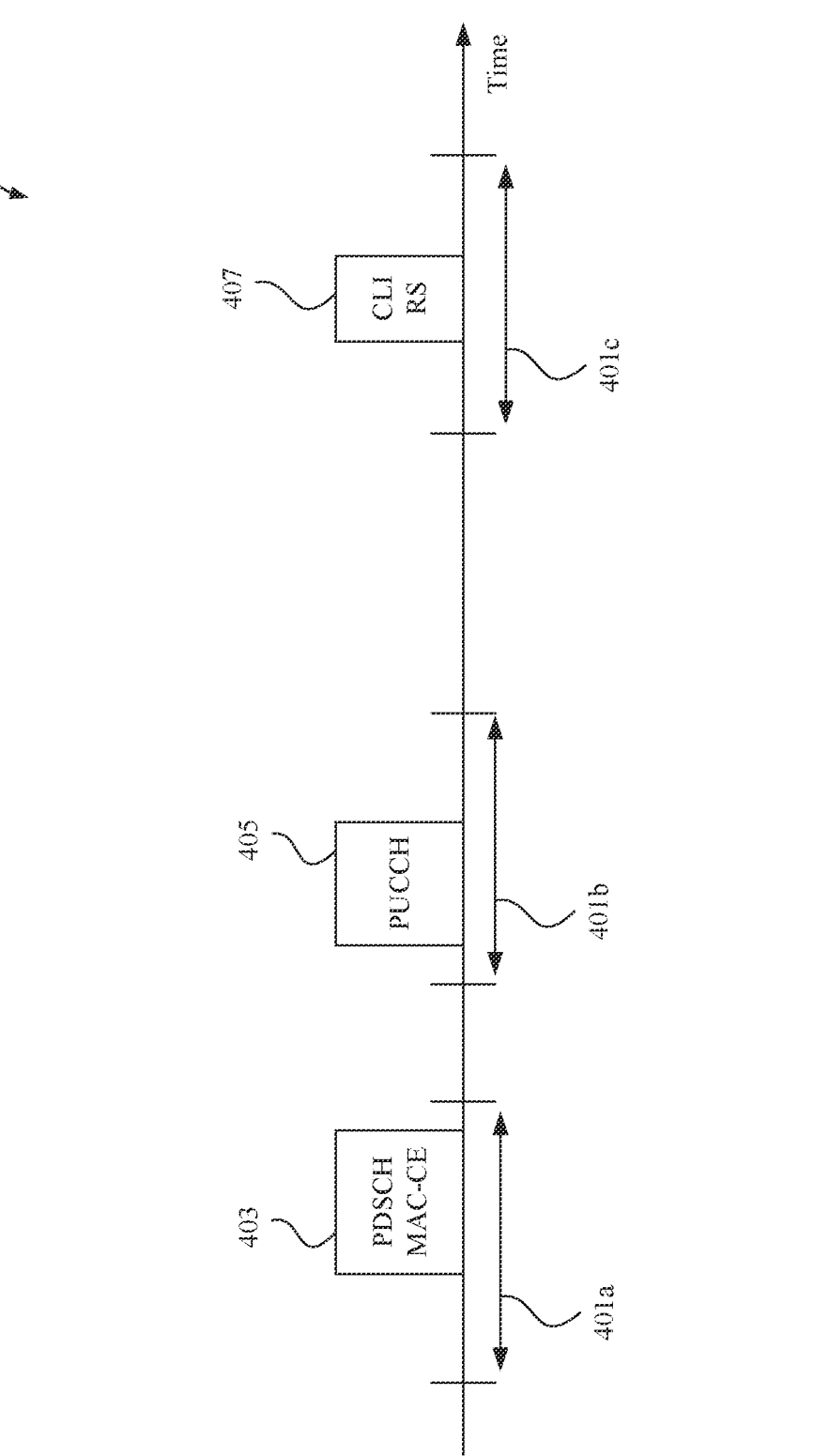
FIG. 4 illustrates an exemplary timing of an activation message and an activated CLI resource, according to some aspects of this disclosure.

FIG. 4 illustrates an exemplary timing 400 of an activation message and an activated CLI resource, according to some aspects of this disclosure. In this example, the UE receives the DL MAC-CE 403 (e.g., PDSCH MAC-CE) during time slot 401a (e.g., slot m) from the base station. After receiving the DL MAC-CE 403, the UE can transmit an acknowledgment message to the base station. For example, the UE transmits a PUCCH message 405 with HARQ-ACK information during time slot 401b (e.g., time slot n). The PUCCH message 405 with HARQ-ACK information corresponds to the DL MAC-CE 403.

According to some aspects, when the UE receives the activation message for preconfigured CLI resource(s) (e.g., the DL MAC-CE 403), the indicated CLI resource(s) by the DL MAC-CE 403 are considered activated starting from the first slot that is after $$n + 3N_{slot}^{subframe,\mu}.$$

In other words, the CLI resource(s) 407 are considered activated from the slot 401c. The slot 401c can be slot $$n + 3N_{slot}^{subframe,\mu} + 1.$$

Here, $\mu$ is the SCS configuration for the PUCCH. Also, $$N_{slot}^{subframe,\mu}$$

is the number of slots within a subframe with the subcarrier spacing $\mu$. According to some examples, $$3N_{slot}^{subframe,\mu}$$

is the time that network need to analyze the acknowledgment message from the UE.

Although the predetermined number of slots after the slot 401*b* is discussed above with respect to $$3N_{slot}^{subframe,\mu},$$

the aspects of this disclosure are not limited to this example, and the predetermined number of slots after the slot 401*b* can include other values. According to some aspects, the slot 401*b* (and/or the time difference between the slot 401*a* and the slot 401*b*) can be indicated using a DCI message that schedules the PDSCH information. When the PDSCH is scheduled, the UE is also notified of the slot 401*b* (and/or the time difference between the slot 401*a* and the slot 401*b*) that the UE transmits the PUCCH HARQ-ACK information. Additionally, or alternatively, the base station can transmit the predetermined number of slots after the slot 401*b* (e.g., the predetermined number of slots between the slots 401*c* and 401*b*) to the UE during, for example, the initial connection establishment as one example.

In addition to, or alternative to, using Layer 2 signaling, such as a DL MAC-CE, the UE can receive the activation message using Layer 1 signaling, such as DCI on the PDCCH to provide an example. According to some aspects, the activation message can include a UE-specific DCI or a group common DCI (GC-DCI). The UE-specific DCI or the GC-DCI can activate (e.g., trigger) the CLI resource(s) or CLI resource set(s). According to some aspects, the UE-specific DCI can be used to activate CLI resource(s) or CLI resource set(s) for one UE. The GC-DCI can be used to activate CLI resource(s) or CLI resource set(s) for a group of UEs.

The UE-specific DCI or the GC-DCI can include UL DCI or DL DCI. The DCI (the UE-specific DCI or the GC-DCI) can be transmitted on the PDCCH in one or more DCI formats, such as DCI Format 0_0, DCI Format 0_1, DCI Format 1_0, DCI Format 1_1, DCI Format 2_0, DCI Format 2_1, DCI Format 2_2, and/or DCI Format 2_3 as outlined by the 3GPP standards to provide some examples.

In this example, a new Radio Network Temporary Identifier (RNTI) e.g., the CLI-RNTI) can be used to activate CLI resource(s) and/or CLI resource set(s). The UE can be configured to receive a DCI with cyclic redundancy check (CRC) scrambled by CLI-RNTI. The DCI can be the UE-specific DCI or the GC-DCI. The UE can be configured to validate one or more fields of the received DCI. If the validation is successful (e.g., the validation is achieved), then the UE can use one or more fields of the DCI to determine the CLI resource(s) and/or the CLI resource set(s) to activate. According to some aspects, validating the one or more fields of the received DCI (e.g., the DCI validation procedure) can be similar to PDCCH validation DL Semi Persistent Scheduling (SPS) and UL grant Type 2 as discussed with respect to 3GPP TS 38.213, Section 10.2, which is incorporated by reference in its entirety. For example, Tables 10.2-1, 10.2-2, 10.2-3, 10.2-4, 10.2A-1, and 10.2A-2 of 3GPP TS 38.213, Section 10.2, which are incorporated by reference in their entireties, can be used for validating the one or more fields of the received DCI (e.g., the DCI validation procedure). For example, the validation of the received DCI format (or the one or more fields of the received DCI) is successful (e.g., achieved) if all or a subset of fields for the received DCI are set according to one or more of Tables 10.2-1, 10.2-2, 10.2-3, 10.2-4, 10.2A-1, and 10.2A-2 of 3GPP TS 38.213, Section 10.2.

Accordingly some aspects, different field(s) of the DCI can be used to communicate the CLI resource(s) and/or the CLI resource set(s) to be activated. These fields can include the CLI resource index(es) and/or CLI resource set index (ex) to indicate the CLI resource(s) and/or the CLI resource set(s) to be activated, respectively. In some examples, the HARQ-ACK bit field of the DCI can be used. For example, the HARQ-ACK bit field can map to the CLI resource index(es) and/or CLI resource set index(ex). In another example, the Modulation and Coding Scheme (MCS) bit field of the DCI can be used. The MCS bit field can map to the CLI resource index(es) and/or CLI resource set index (ex). In another example, other bit fields (such as TPC, or the like) can be used to map to the CLI resource index(es) and/or CLI resource set index(ex). Additionally, or alternatively, one or more new bit fields can be introduced to map to the CLI resource index(es) and/or CLI resource set index(ex).

In addition to, or in alternate to, the CLI-RNTI, other RNTIs can also be used for indicating the activated CLI resource(s) and/or CLI resource set(s). For example, the Cell RNTI (C-RNTI) can be used to activate the CLI resource(s) and/or the CLI resource set(s). In some examples, the UE can receive the DCI with CRC scrambled by the RNTI. The DCI can be the UE-specific DCI or the GC-DCI. In these examples, some of the fields (e.g., bit fields) of the RNTI indicate invalid allocation. By detecting that some fields indicate invalid allocation, the UE will recognize that the RNTI is not for PDSCH or PUCCH allocation, but is for indicating the activation of the CLI resource(s) and/or CLI resource set(s). The UE can use some of the field(s) of the received DCI to determine which CLI resource(s) and/or CLI resource set(s) are to be activated. These field can be similar to the fields discussed above with respect to the CLI-RNTI.

According to some aspects, the activation message can include a Sounding Reference Signal (SRS) request bit field. Additionally, or alternatively, the activation message can include a Channel State Information (CSI) request bit field. In these examples, one or both of the SRS request bit-field or the CSI request bit-field can used to determine the activated CLI resource(s) and/or CLI resource set(s). In these examples, the SRS request bit-field or the CSI request bit field can include the CLI resource index(s) and/or the CLI resource set index(ex) for activating the corresponding CLI resource(s) and/or CLI resource set(s).

According to some aspects, a combination of the Layer 1 signaling and the Layer 2 signaling can be used for activating CLI resource(s) and/or CLI resource set(s). For example, the UE can be RRC configured with one or more CLI resource(s) or one or more CLI resource set(s). The Layer 2 signaling (e.g., MAC-CE) can be used to narrow down the configured one or more CLI resource(s) or the configured one or more CLI resource set(s). Then the Layer 1 signaling (e.g., the DCI) can be used to indicate which CLI resource(s) and/or CLI resource set(s) are activated.

At 308, a CLI measurement is performed during at least one CLI resource of the activated one or more of the plurality of CLI resources. For example, the UE can perform the CLI measurement during the at least one CLI resource of the activated one or more of the plurality of CLI resources. Depending whether CLI resource(s) or CLI resource set(s) are activated, the UE can perform the CLI measurement(s) during the activated CLI resource(s) and/or CLI resource set(s).

In some aspects, the CLI measurements can include a Reference Signal Received Power (RSRP) (e.g., a CLI-RSRP), a Received Signal Strength Indicator (RSSI) (e.g., a CLI-RSSI), a Reference Signal Received Quality (RSRQ) (e.g., a CLI-RSRQ), a Signal-to-Interference-Plus-Noise Ratio (SINR) (e.g., a CLI-SINR), or the like to provide some examples. However, the aspects of this disclosure are not limited to these examples, and the CLI measurements can include other measurements to determine the interference on a victim UE or on a victim BS.

In addition to, or in alternative to, performing CLI measurement, operation 308 (and/or method 300) can further include transmitting a signal during one or more CLI resources of the activated one or more of the plurality of CLI resources. For example, the UE can transmit one or more signals during the activated CLI resource(s) and/or CLI resource set(s) to another UE. In some examples, the UE is transmitting the one or more signals to the BS, which would interfere with signals transmitted by the BS to the other UE, as discussed, for example, with respect to FIGS. 1A and 1B. The other UE can include, for example, the aggressor UE (e.g., the aggressor UE 106 of FIG. 1A or the aggressor UE 128 of FIG. 1B). The other UE (e.g., the aggressor UE) can be configured to perform the CLI measurement(s) during the one or more CLI resources of the activated one or more of the plurality of CLI resources. The signal transmitted by the UE during the one or more CLI resources can include, but is not limited to, a reference signal such as SRS, Demodulation Reference Signal (DMRS), Phase Tracking Reference Signal (PTRS), or the like. However, the aspects of this disclosure are not limited to these signals, and the UE can transmit any other signals, data packet(s), control packet(s), or the like such that the other UE can perform the CLI measurement(s).

According to some aspects, the configuration message that the BS sends to the UE can include a parameter (e.g., a usage parameter) indicating whether the activated CLI resource(s) and/or CLI resource set(s) are to be used for CLI measurement or for transmitting the signal. Additionally, or alternatively, the activation message that the BS sends to the UE can include a parameter (e.g., a usage parameter) indicating whether the activated CLI resource(s) and/or CLI resource set(s) are to be used for CLI measurement or for transmitting the signal. The UE can be an aggressor UE or a victim UE on different instances. By using the parameter in the configuration message and/or the activation message to differentiate between whether a CLI resource (or CLI resource set) is used for transmission or measurement, the UE determines how to use the CLI resource (or CLI resource set). According to some aspects, all CLI resources belonging to the same CLI resource set will have the same usage.

Additionally, or alternatively, the UE can be implicitly indicated whether the activated CLI resource(s) and/or the activated CLI resource set(s) are for transmission or measurement. For example, if the CLI activation message is part of an UL resource allocation for PUSCH transmission, the UE will use the activated CLI resource(s) and/or the activated CLI resource set(s) for transmission. On the other hand, if the activated CLI resource(s) and/or the activated CLI resource set(s) are within an active DL BWP within SBFD symbol, the UE will use the activated CLI resource(s) and/or the activated CLI resource set(s) for CLI measurement(s).

After performing the CLI measurement(s), the UE can prepare a CLI report and transmit the CLI report to the BS. According to some aspects, the BS can use the CLI report to control the operations of the UEs (e.g., the victim UE and/or the aggressor UE) to decrease the CLI between the UEs. Additionally, or alternatively, if the CLI is between BSs, the network can use the CLI report to control the operations of the BSs (e.g., the victim BS and/or the aggressor BS) to decrease the CLI between the BSs. According to some aspects, preparing the CLI report and/or transmitting the CLI report can happen immediately after the UE performs the CLI measurement(s). Additionally, or alternatively, the UE can prepare the CLI report and/or transmit the CLI report after the activated CLI resources are deactivated.

At 310, a deactivation message is received from the base station deactivating the one or more of the plurality of CLI resources. For example, the UE can receive the deactivation message from the base station. The deactivation message can deactivate one or more of the activated CLI resource(s) and/or can deactivate one or more of the activated CLI resource set(s). By deactivating the one or more of the activated CLI resource(s) and/or the one or more of the activated CLI resource set(s), the UE will not perform CLI measurements during the deactivated CLI resource(s) or during the deactivated CLI resource set(s). According to some examples, the deactivation message can deactivate one or more individual CLI resources using CLI resource indexes. Additionally, or alternatively, the deactivation message can activate one or more CLI resource sets using CLI resource set index.

According to some aspects, the deactivation message can be similar to the activation message discussed above. In these examples, the transmission of the deactivation message by the BS and the reception of the deactivation message by the UE can be similar to the operation 306 discussed above with respect to the activation message. For example, the UE can receive the deactivation message using Layer 1 signaling, such as DCI on the PDCCH to provide an example, and/or Layer 2 signaling, such as a DL MAC-CE to provide an example. For example the deactivation message can include DL MAC-CE. Additionally, or alternatively, the deactivation message can include a GC-DCI. Additionally, or alternatively, the deactivation message can include a SRS request bit-field or a CSI request bit field.

According to some aspects, instead of using the deactivation message, the UE can use, for example, a timer to deactivate the activated CLI resource(s) and/or the activated CLI resource set(s). In these examples, the configuration message sent to the UE to configure the CLI resources can further include a threshold for deactivation. In some examples, the threshold can be a number of slots. After the UE activates the CLI resource(s) and/or the CLI resource set(s) after receiving the activation message, the UE can start a timer. After the time reaches the threshold, the UE can deactivate the activated CLI resource(s) and/or the activated CLI resource set(s). In these examples, no additional signaling is used for deactivation. In some examples, the timer and the threshold can be used for aperiodic CLI resource activation.

Figure 5:
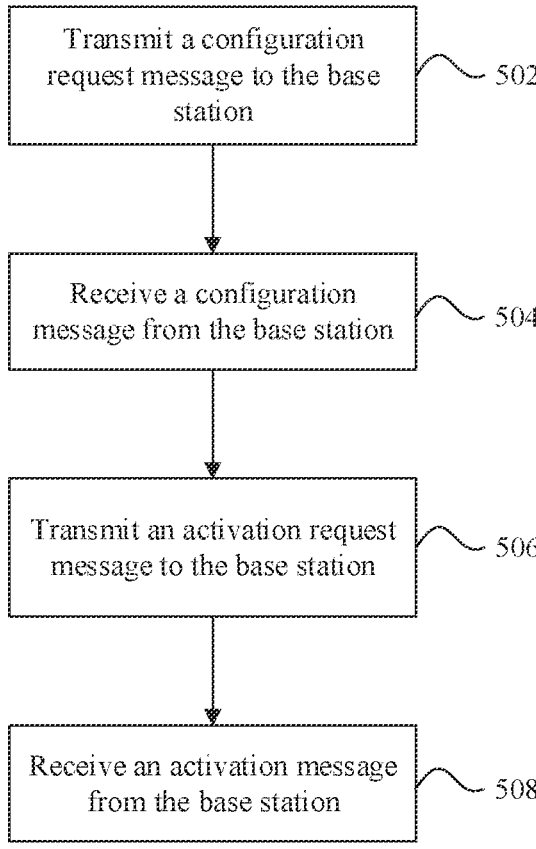
FIG. 5 illustrates an example method for a system (for example, a UE) requesting CLI resource configuration and CLI resource activation, according to some aspects of the disclosure.

In addition to, or alternatively to, method 300, the UE can request for CLI resource configuration and/or for CLI resource activation. FIG. 5 illustrates an example method 500 for a system (for example, a UE) requesting CLI resource configuration and CLI resource activation, according to some aspects of the disclosure. As a convenience and not a limitation, FIG. 5 may be described with regard to elements of FIGS. 1-4. Method 500 may represent the operation of an electronic device (for example, the victim UE 104 of FIG. 1A and/or the victim UE 124 of FIG. 1B) implementing the CLI measurement indication. Method 500 may also be performed by system 200 of FIG. 2 and/or computer system 700 of FIG. 7. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

Although method 500 is discussed with respect to a victim UE, the aspects of this disclosure are not limited to this example. For example, method 500 may be performed by an aggressor UE (e.g., the aggressor UE 106 of FIG. 1A and/or the aggressor UE 128 of FIG. 1B). Additionally, or alternatively, method 500 may be performed by a victim BS (e.g., the victim BS 126 of FIG. 1B).

At 502, a configuration request message is transmitted to the base station. For example, the UE can transmit the configuration request message to the base station. According to some aspects, the UE may demand one or more specific CLI resource(s) and/or one or more specific CLI resource set(s) to be configured. The configuration request message can include any information that determines the CLI resource(s) and/or the CLI resource set(s) that the UE wants to be configured. This information can include, but is not limited, to the Resource Block (RB) set that the CLI resource(s) and/or the CLI resource set(s) spans, the slots and symbols within such slots that the CLI resource(s) and/or the CLI resource set(s) is desired, or the like. In some examples, the configuration request message can indicate a request to configure more than one CLI resource and/or more than one resource set.

At 504, a configuration message is received from the base station. For example, the UE can receive the configuration message from the base station in response to the configuration request message of operation 502. In some examples, the configuration message of operation 504 can be similar to the configuration message discussed above, for example, with respect to operation 304. According to some aspects, the configuration message of operation 504 can configure all or a subset of that the CLI resource(s) and/or the CLI resource set(s) requested by the UE in the configuration request message of operation 502.

In some aspects, the configuration message indicates the CLI resource(s) and/or CLI resource set(s) that can be used for CLI measurements and/or for transmitting signals to, for example, other UEs for CLI measurements. As discussed above, the CLI resource configuration can include time domain configuration, frequency domain configuration, and/or beam indication. For example, the configuration message can include one or more parameters indicating the CLI resource configuration. The one or more parameters indicating the CLI resource configuration can include parameter(s) for time domain configuration, frequency domain configuration, and/or beam indication.

At 506, an activation request message is transmitted to the base station. For example, the UE can transmit the activation request message to the base station. The activation request message includes a request to activate one or more CLI resource(s) and/or one or more CLI resource set(s).

In some aspects, the activation request message can be in response to the configuration message of operation 504 and can indicate one or more CLI resource(s) and/or one or more CLI resource set(s) from the configuration message of operation 504. Additionally, or alternatively, operations 506 and 508 can be independent from operations 502 and 504. In other words, the activation request message can indicate one or more CLI resource(s) and/or one or more CLI resource set(s) from the configuration message of operation 304 of FIG. 3.

According to some aspects, the activation request message can be based on Layer 1 signaling, such as DCI on the PDCCH to provide an example, and/or Layer 2 signaling, such as a DL MAC-CE to provide an example. The activation request message can request to activate one or more CLI resource(s) and/or one or more CLI resource set(s) from predetermined CLI resource(s) and/or predetermined CLI resource set(s).

In some examples, the activation request message can indicate the CLI resource indexes and/or CLI resource set indexes of the CLI resource(s) and/or CLI resource set(s), respectively, that the UE desires to activate. In some examples of Layer 1 signaling, the activation message can be part of a HARQ-ACK or other Uplink Control Information (UCI) parameters. In other words, the CLI resource indexes and/or CLI resource set indexes of the CLI resource(s) can be encoded as part the HARQ-ACK or other UCI parameters. In some aspects, if the UE is configured with only one CLI resource (or one CLI resource set), a single bit is sufficient for demand indication.

In another example of Layer 1 signaling, one or more of Sounding Reference (SR) (or SRS) resources can be configured as part of the activation request message. Each SR (or SRS) resource can be associated to one or more CLI resource(s) and/or one or more CLI resource set(s). The UE can demand the activation of the corresponding CLI resource(s) and/or CLI resource set(s) by transmitting the associated SR (or SRS) resource(s).

In some examples of Layer 2 signaling, the activation request message can include, or be part of, the UL MAC-CE. For example, the UE can use the UL MAC-CE to indicate the CLI resource indexes and/or CLI resource set indexes of the CLI resource(s) and/or CLI resource set(s), respectively, that the UE desires to activate.

At 508, an activation message is received from the base station. For example, the UE receives the activation message from the base station. The activation message and the operation of receiving the activation message can be similar to operation 306 of FIG. 3. According to some aspects, the base station can activate all or a subset of the CLI resource(s) and/or CLI resource set(s) that the UE requested in operation 506.

FIG. 6 illustrates an example method 600 for a system (for example, a BS) implementing the CLI measurement indication, according to some aspects of the disclosure. As a convenience and not a limitation, FIG. 6 may be described with regard to elements of FIGS. 1-5. Method 600 may represent the operation of an electronic device (for example, the BS 102 of FIG. 1A and/or the BSs 122 or 126 of FIG. 1B) implementing the CLI measurement indication. Method 600 may also be performed by system 200 of FIG. 2 and/or computer system 700 of FIG. 7. But method 600 is not limited to the specific aspects depicted in those figures and other systems may be used to perform the method as will be understood by those skilled in the art. It is to be appreciated that not all operations may be needed, and the operations may not be performed in the same order as shown in FIG. 6.

Although method 600 is discussed with respect to a victim UE, the aspects of this disclosure are not limited to this example. For example, method 600 may be performed with respect to an aggressor UE (e.g., the aggressor UE 106 of FIG. 1A and/or the aggressor UE 128 of FIG. 1B). Additionally, or alternatively, method 600 may be performed with respect to a victim BS (e.g., the victim BS 126 of FIG. 1B) or an aggressor BS (e.g., the aggressor BS 122 of FIG. 1B).

At 602, the BS transmits a configuration message to the UE. The configuration message can include information for one or more CLI resource(s) and/or for one or more CLI resource set(s). As discussed above, the configuration message can be and/or be part of an RRC message. The configuration message can be transmitted in response to one or more parameters received from the UE (e.g., operation 302 of FIG. 3). The one or more parameters can include the maximum number (e.g., N) of the CLI resource sets per active BWP within the SBFD symbol that the UE can support. Additionally, or alternatively, the one or more parameters can include the maximum number (e.g., P) of CLI resources per a CLI resource set that the UE can support. Additionally, or alternatively, the BS transmits the configuration message in response to a configuration request message (e.g., operations 502 and 504 of FIG. 5) that the BS receives from the UE.

At 604, the BS transmits an activation message to the UE. The activation message can include information for activating one or more of the configured CLI resources and/or one or more of the configure CLI resource sets. The activation message was discussed in detail above with respect to FIGS. 1-5. In some aspects, the BS transmits the activation message in response to an activation request message (e.g., operations 506 and 508 of FIG. 5) that the BS receives from the UE.

At 606, the BS receives one or more CLI measurements from the UE. For example, the BS can receive one or more CLI reports including the CLI measurements from the UE. In some aspects, the BS receives the one or more CLI measurements from a victim UE and/or a victim BS. Additionally, or alternatively, the BS receives the one or more CLI measurements from an aggressor UE and/or an aggressor BS. The one or more CLI measurements are performed by the UE during the activated CLI resources and/or activated CLI resource sets. According to some aspects, the BS can use the one or more CLI measurement to control the operations of the UEs (e.g., the victim UE and/or the aggressor UE) to decrease the CLI between the UEs.

At 608, the BS transmits a deactivation message to the UE. The deactivation message (e.g., as discussed with respect to operation 310 of FIG. 3) deactivates all or a subset of the activated CLI resources and/or activated CLI resource sets.

Figure 7:
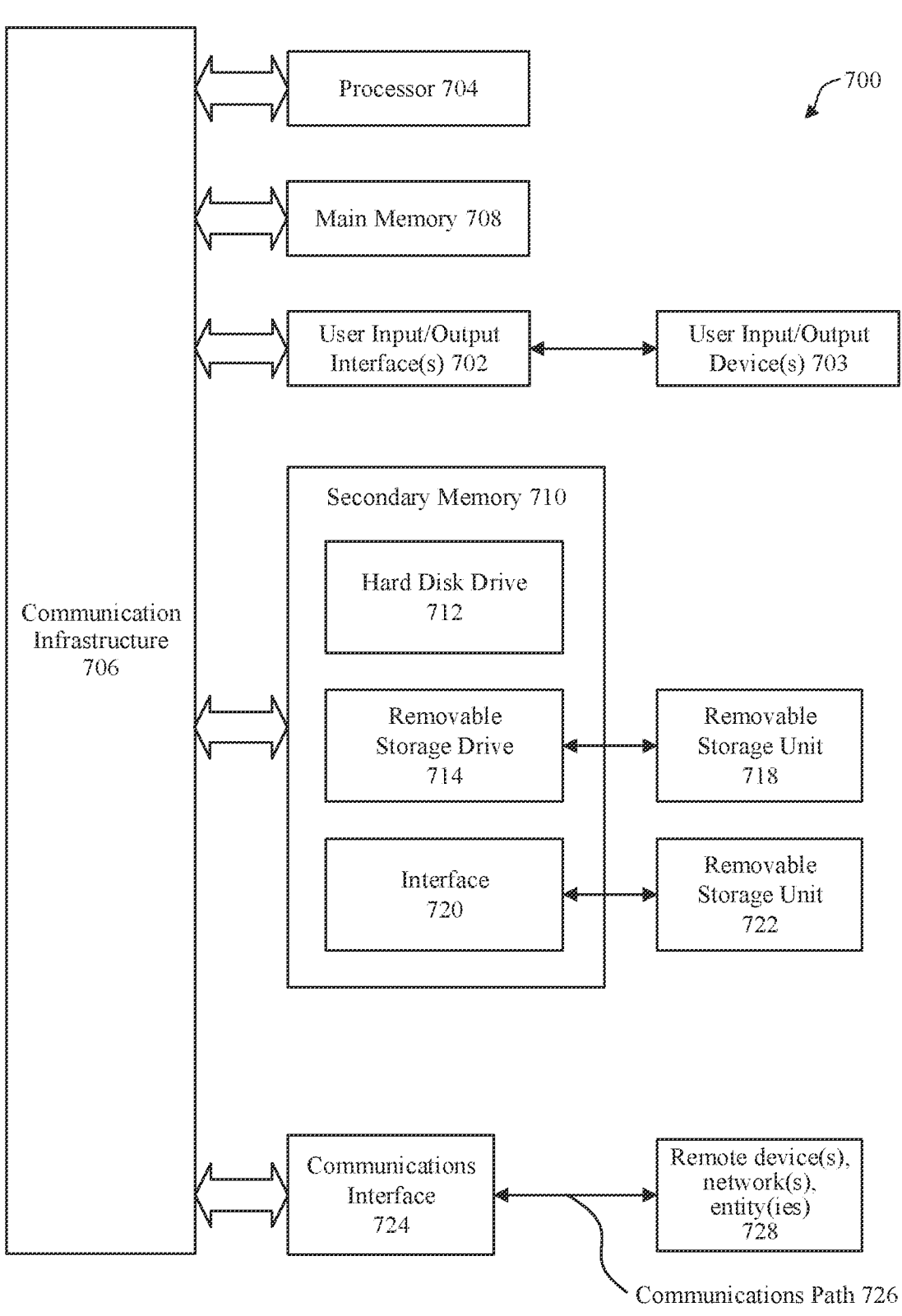
FIG. 7 is an example computer system for implementing some aspects or portion(s) thereof The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

Various aspects can be implemented, for example, using one or more computer systems, such as computer system 700 shown in FIG. 7. Computer system 700 can be a computer system capable of performing the functions described herein such as devices 102, 104, 106 of FIG. 1A, 122, 124, 126, 128 of FIG. 1B, and/or 200 of FIG. 2. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
a transceiver configured to enable wireless communication with a base station; and
a processor communicatively coupled to the transceiver and configured to:
receive, using the transceiver, a configuration message from the base station indicating a plurality of cross link interference (CLI) resources for CLI-Received Signal Strength Indicator (CLI-RSSI) measurement, wherein the configuration message comprises a Radio Resource Control (RRC) message comprising a number of the plurality of the CLI resources configured per an active bandwidth part (BWP) within a sub-band full-duplex (SBFD) symbol;
receive, using the transceiver, an activation message from the base station activating one or more of the plurality of CLI resources; and
perform a CLI measurement during at least one CLI resource of the activated one or more of the plurality of CLI resources, wherein the CLI measurement comprises the CLI-RSSI measurement.

2. The UE of claim 1, wherein the RRC message further comprises a CLI resource configuration for indicating the plurality of CLI resources.

3. The UE of claim 2, wherein the CLI resource configuration comprises:
a time domain CLI resource configuration indicating a plurality of slots and a plurality of symbols within each of the plurality of slots for the plurality of CLI resources;
a frequency domain CLI resource configuration indicating a starting physical resource block (PRB), a number of occupied PRBs for the plurality of CLI resources; and
a beam configuration indicating one or more receive beams for the plurality of CLI resources.

4. The UE of claim 3, wherein:
the plurality of CLI resources comprises a first CLI resource set and a second CLI resource set,
the first CLI resource set comprises first CLI resources of the plurality of CLI resources and is associated with a first CLI resource set index,
the second CLI resource set comprises second CLI resources of the plurality of CLI resources and is associated with a second CLI resource set index, and
the CLI resource configuration comprises a first CLI resource configuration part associated with the first CLI resource set and a second CLI resource configuration part associated with the second CLI resource set.

5. The UE of claim 4, wherein:
the first CLI resource set index is used for activating and deactivating the first CLI resources of the first CLI resource set, and
the second CLI resource set index is used for activating and deactivating the second CLI resources of the second CLI resource set.

6. The UE of claim 4, wherein:
the configuration message further comprises a maximum number of CLI resource sets per the active BWP within the SBFD symbol, and the number of the plurality of the CLI resources and the maximum number of CLI resource sets are based on UE capability.

7. The UE of claim 2, wherein each of the plurality of CLI resources is associated with a CLI resource index and wherein each CLI resource index is used for activating and deactivating its associated CLI resource.

8. The UE of claim 1, wherein:
the activation message comprises a downlink (DL) Medium Access Control (MAC) Control Element (MAC-CE),
the DL MAC-CE comprises CLI resource indexes of the activated one or more of the plurality of CLI resources or CLI resource set indexes of CLI resource sets associated with the activated one or more of the plurality of CLI resources, and
the processor is further configured to:
transmit, using the transceiver, an acknowledgment message to the base station during a first slot; and
perform the CLI measurement during at least one CLI resource of the activated one or more of the plurality of CLI resources, the at least one CLI resource being during a second slot, and the second slot being a predetermined number of slots after the first slot.

9. The UE of claim 1, wherein the activation message comprises a UE-specific Downlink Control Information (DCI) or a group common DCI (GC-DCI).

10. The UE of claim 9, wherein the processor is further configured to:
receive the UE-specific DCI or the GC-DCI with a cyclic redundancy check (CRC) scrambled with a CLI Radio Network Temporary Identifier (RNTI);
validate one or more fields of the UE-specific DCI or the GC-DCI; and
determine the activated one or more of the plurality of CLI resources.

11. The UE of claim 10, wherein:
a Hybrid Automatic Repeat Request (HARQ) acknowledgment (HARQ-ACK) bit field of the UE-specific DCI or the GC-DCI maps to a CLI resource index or to a CLI resource set index, or
a Modulation and Coding Scheme (MCS) bit field of the UE-specific DCI or the GC-DCI maps to the CLI resource index or to the CLI resource set index, or
a bit field of the UE-specific DCI or the GC-DCI different from the HARQ-ACK bit field and the MCS bit field maps to the CLI resource index or to the CLI resource set index.

12. The UE of claim 1, wherein the activation message comprises one or more of a Sounding Reference Signal (SRS) request bit field or a Channel State Information (CSI) request bit field are used to determine the activated one or more of the plurality of CLI resources.

13. The UE of claim 1, wherein the processor is further configured to receive, using the transceiver, a deactivation message from the base station deactivating the one or more of the plurality of CLI resources.

14. The UE of claim 13, wherein:
the deactivation message comprises a downlink (DL) Medium Access Control (MAC) Control Element (MAC-CE), or
the deactivation message comprises a UE-specific Downlink Control Information (DCI) or a group common DCI (GC-DCI), or
the deactivation message comprises one or more of a Sounding Reference Signal (SRS) request bit field or a Channel State Information (CSI) request bit field.

15. The UE of claim 1, wherein the processor is further configured to deactivate the one or more of the plurality of CLI resources based on threshold for deactivation in the configuration message.

16. The UE of claim 1, wherein the processor is further configured to transmit, to a second UE, a signal during another CLI resource of the activated one or more of the plurality of CLI resources, wherein the second UE is configured to perform CLI measurement during the other CLI resource of the activated one or more of the plurality of CLI resources.

17. The UE of claim 16, wherein the configuration message comprises a parameter indicating whether the activated one or more of the plurality of CLI resources is used for CLI measurement or for transmitting the signal.

18. The UE of claim 1, wherein the processor is further configured to:
transmit a configuration request message to the base station for configuring a second plurality of CLI resources;
receive a second configuration message from the base station in response to the configuration request message;
transmit an activation request message to the base station for activating one or more of the second plurality of CLI resources, wherein the activation request message is based on Layer 1 signaling or is based on Layer 2 signaling; and
receive a second activation message from the base station activating a subset of the one or more of the second plurality of CLI resources.

19. A method performed by a user equipment (UE), comprising:
receiving a configuration message from a base station indicating a plurality of cross link interference (CLI) resources for CLI-Received Signal Strength Indicator (CLI-RSSI) measurement, wherein the configuration message comprises a Radio Resource Control (RRC) message comprising a number of the plurality of the CLI resources configured per an active bandwidth part (BWP) within a sub-band full-duplex (SBFD) symbol;
receiving an activation message from the base station activating one or more of the plurality of CLI resources, wherein the activation message is based on Layer 1 signaling or Layer 2 signaling; and
performing a CLI measurement during at least one CLI resource of the activated one or more of the plurality of CLI resources, wherein the CLI measurement comprises the CLI-RSSI measurement.

20. A non-transitory computer-readable medium storing instructions that when executed by a processor of a user equipment (UE) cause the UE to perform operations comprising:
receiving a configuration message from a base station indicating a plurality of cross link interference (CLI) resources for CLI-Received Signal Strength Indicator (CLI-RSSI) measurement, wherein the configuration message comprises a Radio Resource Control (RRC) message comprising a number of the plurality of the CLI resources configured per an active bandwidth part (BWP) within a sub-band full-duplex (SBFD) symbol;
receiving an activation message from the base station activating one or more of the plurality of CLI resources, wherein the activation message is based on Layer 1 signaling or Layer 2 signaling; and performing a CLI measurement during at least one CLI resource of the activated one or more of the plurality of CLI resources, wherein the CLI measurement comprises the CLI-RSSI measurement.

\* \* \* \* \*